(12) United States Patent
Jabbar et al.

(10) Patent No.: US 11,716,626 B2
(45) Date of Patent: Aug. 1, 2023

(54) NETWORK ACCESS CONTROL SYSTEM

(71) Applicant: General Electric Company, Schenectady, NY (US)

(72) Inventors: Abdul Jabbar, Altamont, NY (US); William David Smith, II, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 859 days.

(21) Appl. No.: 16/660,345

(22) Filed: Oct. 22, 2019

(65) Prior Publication Data
US 2021/0120418 A1 Apr. 22, 2021

(51) Int. Cl.
*H04L 9/00* (2022.01)
*H04W 12/084* (2021.01)
*H04W 12/06* (2021.01)
*H04L 9/40* (2022.01)

(52) U.S. Cl.
CPC ........... *H04W 12/084* (2021.01); *H04L 63/08* (2013.01); *H04L 63/105* (2013.01); *H04W 12/06* (2013.01); *H04L 2463/082* (2013.01)

(58) Field of Classification Search
CPC ..... H04W 12/084; H04L 63/08; H04L 63/105
USPC .......................................................... 726/4
See application file for complete search history.

(56) References Cited

U.S. PATENT DOCUMENTS

| 9,319,332 | B2 | 4/2016 | Thubert et al. |
| 10,015,795 | B1 | 7/2018 | Wolf et al. |
| 10,210,333 | B2 | 2/2019 | Smith, II et al. |
| 10,313,268 | B2 | 6/2019 | Gotz et al. |
| 11,005,839 | B1 * | 5/2021 | Shahidzadeh ......... H04W 12/06 |
| 11,057,748 | B1 * | 7/2021 | Zoller ............... H04W 28/0289 |
| 11,252,190 | B1 * | 2/2022 | Sharifi Mehr .......... H04L 63/10 |

(Continued)

FOREIGN PATENT DOCUMENTS

CN 105471901 A 4/2016

OTHER PUBLICATIONS

Lohstroh et al., "On Enabling Technologies for the Internet of Important Things", Feb. 25, 2019, IEEE Access, vol. 07, pp. 27244-27256.

*Primary Examiner* — Christopher J Brown
(74) *Attorney, Agent, or Firm* — Buckley, Maschoff & Talwalkar LLC

(57) ABSTRACT

A network access control system includes a communication device and an authorization system. The communication device is configured to communicate time-critical messages through a time-sensitive network during scheduled time windows. The communication device is further configured to be communicatively connected to a candidate device and to receive a network access request from the candidate device while blocking the candidate device from communicating through the time-sensitive network. The authorization system is communicatively connected to the communication device and configured to authorize the candidate device via a multi-factor authentication protocol that requires a user of the candidate device to successfully provide multiple identification factors. In response to the authorization system authorizing the candidate device, the communication device is configured to grant the candidate device restricted access to one or more of send or receive approved messages through the time-sensitive network.

21 Claims, 3 Drawing Sheets

(56) References Cited

U.S. PATENT DOCUMENTS

| | | | |
|---|---|---|---|
| 2011/0307947 A1* | 12/2011 | Kariv | H04L 63/08 |
| | | | 726/9 |
| 2016/0036861 A1* | 2/2016 | Mattes | H04L 63/20 |
| | | | 726/1 |
| 2018/0176222 A1 | 6/2018 | Bhaskar et al. | |
| 2019/0123847 A1 | 4/2019 | Bush et al. | |
| 2019/0130701 A1* | 5/2019 | Simons | H04L 9/3239 |
| 2019/0322299 A1* | 10/2019 | Mong | H04L 67/12 |
| 2020/0259896 A1* | 8/2020 | Sachs | H04L 67/1046 |
| 2021/0014319 A1* | 1/2021 | Milton | H04L 67/01 |

* cited by examiner

NETWORK ACCESS CONTROL SYSTEM

FIELD

The subject matter described herein relates to restricting access to communications within computerized networks.

BACKGROUND

Cybersecurity is a significant challenge for modern industrial control systems that rely on timely communication of information between various parties, such as control devices, equipment, machinery, sensors, operator input devices, and the like. Network security systems utilize firewalls and other electronic barriers to block unauthorized access to the network from outside sources. However, these security systems may be susceptible to threats that involve an unauthorized user providing authentic credentials. For example, malevolent actors may be able to penetrate an electronic security perimeter through the use of credential-harvesting, which refers to illegitimate acquisition of authentic credentials, such as passwords, tokens, and/or other authentication keys. Furthermore, once inside the security perimeter, the malevolent actors can use existing software tools and utilizing on a compromised computing device, such as a workstation or computer, to effect malicious changes in the industrial control system.

SUMMARY

In one or more embodiments, a network access control system includes a communication device and an authorization system. The communication device is configured to communicate time-critical messages through a time-sensitive network during scheduled time windows. The communication device is further configured to be communicatively connected to a candidate device and to receive a network access request from the candidate device while blocking the candidate device from communicating through the time-sensitive network. The authorization system is communicatively connected to the communication device and configured to authorize the candidate device via a multi-factor authentication protocol that requires a user of the candidate device to successfully provide multiple identification factors. In response to the authorization system authorizing the candidate device, the communication device is configured to grant the candidate device restricted access to one or more of send or receive approved messages through the time-sensitive network.

In one or more embodiments, a method for restricting access to a time-sensitive network includes receiving a network access request at a communication device that is configured to communicate time-critical messages through a time-sensitive network during scheduled time windows. The network access request is received from a candidate device while the candidate device is blocked by the communication device from communicating through the time-sensitive network. Responsive to receiving the network access request, the method includes authorizing the candidate device via a multi-factor authentication protocol that requires a user of the candidate device to successfully provide multiple identification factors. Responsive to authorizing the candidate device, the method includes granting the candidate device restricted access for one or more of sending or receiving approved messages through the time-sensitive network.

In one or more embodiments, a communication system includes a time-sensitive network and an authorization system. The time-sensitive network includes plural communication devices interconnected by communication links. The communication devices are configured to communicate data packets representing time-critical traffic via the communication links during designated time windows according to a schedule of the time-sensitive network. The communication devices are also configured to communicate data packets representing best-effort traffic via the communication links outside of the designated time windows. The authorization system is communicatively connected to a candidate device via a first communication device of the communication devices. The first communication devices is configured to receive a network access request from the candidate device while blocking the candidate device from communicating through the time-sensitive network. The authorization system is configured to authorize the candidate device via a multi-factor authentication protocol that requires a user of the candidate device to successfully provide multiple identification factors. In response to the authorization system authorizing the candidate device, the first communication device is configured to grant the candidate device restricted access for allowing the candidate device to one or more of send or receive messages within the best-effort traffic without allowing the candidate device to one or more of send or receive messages within the time-critical traffic.

BRIEF DESCRIPTION OF THE DRAWINGS

The inventive subject matter will be better understood from reading the following description of non-limiting embodiments, with reference to the attached drawings, wherein below.

DETAILED DESCRIPTION

Figure 1:
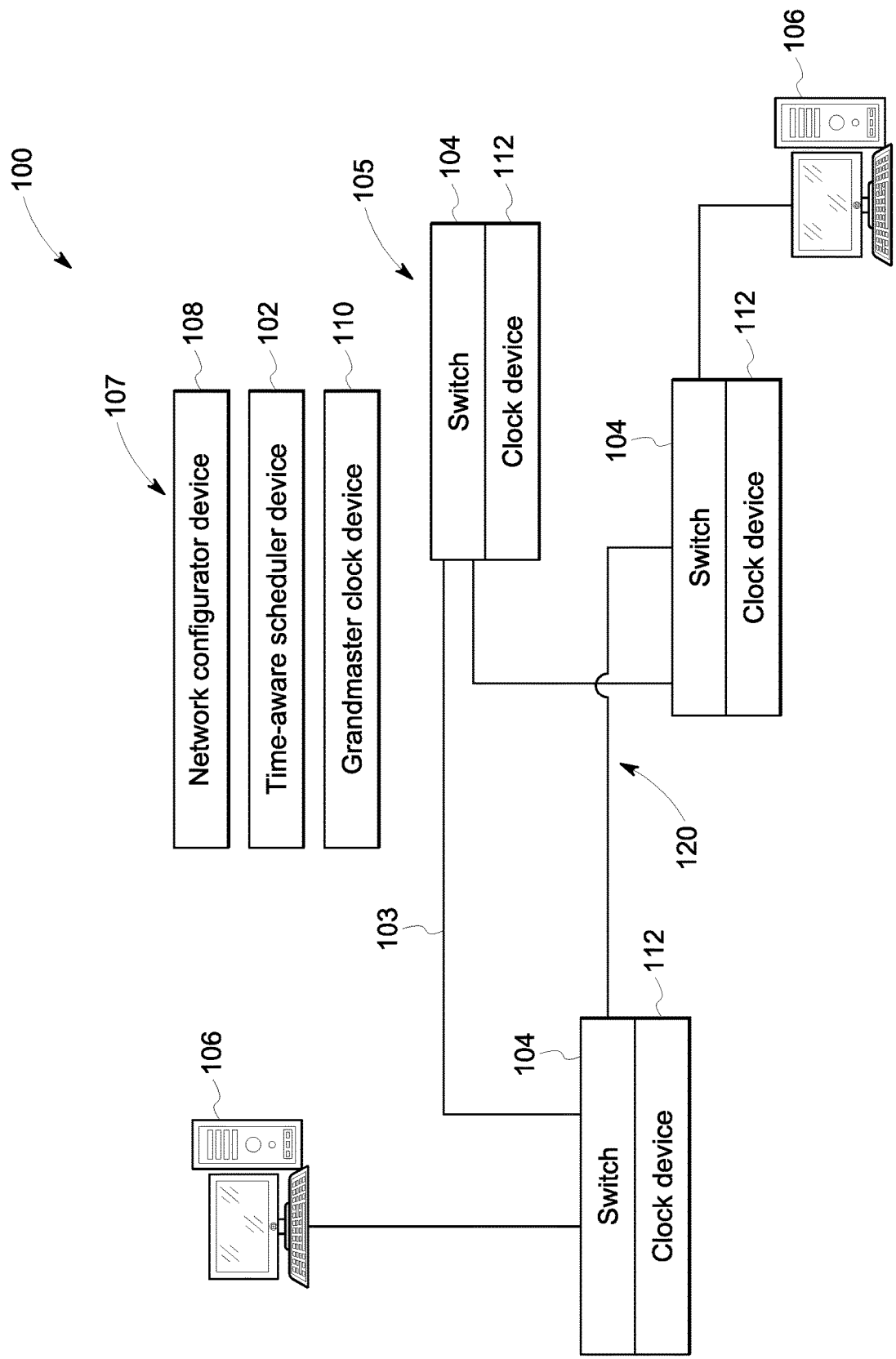
FIG. 1 schematically illustrates a time-sensitive network in accordance with embodiments herein.

Reference now will be made in detail to embodiments of the present disclosure, one or more examples of which are illustrated in the drawings. Each example is provided by way of explanation of the present disclosure and is not a limitation of the present disclosure. Features illustrated or described as part of one embodiment can be used with another embodiment to yield a still further embodiment. Thus, it is intended that the present disclosure covers such modifications and variations as come within the scope of the appended claims and their equivalents.

One or more embodiments of the inventive subject matter described herein relate to systems and methods that increase cybersecurity in network communications. The cybersecurity may be increased by performing better vetting of devices that attempt to access the network communications, relative to known cybersecurity systems. For example, the systems and methods described herein require multi-factor authentication prior to enabling a device to communicate within the network. The multi-factor authentication requires a user operating the device to provide multiple different modalities or forms of authentication or proof of identity, such as secret information, possessed tokens, and/or inherent characteristics (e.g., biometrics). In one or more embodiments, upon satisfaction of the authentication process, the device is granted restricted or limited access to the network. Limiting the access may further protect the security and integrity of the network, such as be avoiding potential interference with high priority messages communicated through the network. In one or more embodiments, the network access control system is incorporated within a time-sensitive network to restrict access to the time-sensitive network. Time-sensitive networking refers to a series of standards that describe how to implement deterministic, scheduled data packet or frame delivery within a network, such as an Ethernet network. Time-sensitive networks may benefit from advances in time precision and stability to create efficient, deterministic traffic flows in the network.

FIG. 1 schematically illustrates one embodiment of a time-sensitive network 100. The components shown in FIG. 1 represent hardware circuitry that includes and/or is connected with one or more processors (e.g., one or more microprocessors, field programmable gate arrays, and/or integrated circuits) that operate to perform the functions described herein. The components of the network 100 can be communicatively coupled with each other by one or more wired and/or wireless connections. Not all connections between the components of the network 100 are shown herein. The network 100 can be a time-sensitive network configured to operate according to one or more of the time-sensitive network standards of IEEE, such as the IEEE 802.1AS™-2011 Standard and/or the IEEE 802.1Q™-2018 Standard.

The time-sensitive network 100 includes several nodes 105 formed of network switches 104 and associated clocks 112 ("clock devices" in FIG. 1). While only three nodes 105 are shown in FIG. 1, the network 100 can be formed of many more nodes 105. The switches 104 of the nodes 105 may include or represent electrical switches, routers, bridges, hubs, and/or the like. The nodes 105 are communicatively connected to one another via the communication links 103. The links 103 include or represent physical communication pathways, such as copper wires and/or cables, optical fibers and/or cables, and the like. The time-sensitive network also includes a network control system 107.

The time-sensitive network 100 can be an Ethernet network that communicates data packets (or frames) as signals along traffic flow paths 120 between end devices 106. The end devices 106 communicate with each other via the time-sensitive network 100. The end devices 106 may include or represent computers, sensors, servers, control devices, input/output devices, and the like. The traffic flow paths 120 are defined by the nodes 105 and the communication links 103. The data packets are communicated between the nodes 105 and the end devices 106 via the communication links 103 on a schedule of the network 100, with the schedule restricting what data signals can be communicated by each of the nodes 105 at different times.

The network control system 107 may include a time-aware scheduler device 102, a network configurator device 108, and a grandmaster clock device 110. The clock devices 112 of the nodes 105 and the time-aware scheduler device 102 may be synchronized with the grandmaster clock device 110. The time-aware scheduler device 102 (referred to herein as scheduler device 102) can be formed from hardware circuitry that is connected with and/or includes one or more processors that generate a schedule for controlling the flow of communications through the time-sensitive network 100. The one or more processors of the scheduler device 102 may be disposed at the switch 104 of a single node 105, may be distributed among the switches 104 of multiple nodes 105, or may be separate and discrete from the nodes 105.

The schedule dictates the actions and timing of each of the switches. The schedule may instruct each interface of a node 105 to transmit a specific data packet along a predefined path 120 at a prescheduled time or window, creating deterministic traffic flows while sharing the same media with legacy, best-effort Ethernet traffic. For example, the schedule may dictate that a given switch 104 accepts a first data packet at a first time or window, and the switch 104 transmits the first data packet along a designated communication link 103 at a different, second time or window.

The scheduler device 102 may solve a system of scheduling equations to create the schedule for the time-sensitive network 100. The schedule may be subject to various constraints, such as the topology of the network 100, the speed of communication by and/or between switches 104, the amount of data packets to be communicated through different switches 104, etc. The schedule can be created to avoid two or more data packets colliding with each other at a switch 104 (e.g., to prevent multiple frames from being communicated through the same switch 104 at the same time).

Different data packets can be communicated at different repeating scheduled time periods based on traffic classifications of the signals. Some data packets are classified as time-critical traffic while other data packets are classified as best-effort traffic. The data packets in the time-critical traffic represent messages (e.g., time-critical messages) that need or are required to be communicated at or within designated periods of time to ensure the safe operation of an industrial control system. If a time-critical message is not received within the designated time period or window, the lack of timely receipt of the time-critical message may risk of harm to people and/or damage. The data packets in the best-effort traffic represent messages (e.g., best-effort messages) that are not required to ensure the safe operation of the industrial control system, but that are communicated for other purposes (e.g., monitoring component operations, changing component settings, updating software and firmware, etc.). The time-critical messages have a higher priority than the best-effort messages.

The time-critical traffic may be periodic. For example, a sensor may be controlled to periodically communicate a data signal to a control device at a designated time window. The data packets from the sensor may be classified as time-critical traffic because the sensor is used to confirm safe operation of an industrial machine. On the other hand, the best-effort traffic may be aperiodic or ad hoc. For example, an operator may control an input device to communicate a control signal to a control device for changing a setting of a machine. Such a control signal may not be provided regularly, unlike the communication of the sensor signals. Furthermore, the setting change may not be necessary for safe operation of the industrial control system, so the data packets that represent the control signal are relegated to the best-effort traffic.

The scheduler device 102 can generate the schedule to provide designated time windows for the communication of time-critical messages through the time-sensitive network 100. Optionally, only the time-critical messages may be communicated within the designated time windows to avoid the risk of interference or interruption in the flow of time-critical data packets to the recipient end devices 106. In an embodiment, the best-effort traffic is communicated through the time-sensitive network 100 outside of the designated time windows. The best-effort traffic may be delayed, if necessary, to ensure the timely arrival of the time-critical data packets within the scheduled time windows.

The network configurator device 108 of the control system 107 may be comprised of software and/or hardware that has knowledge of the physical topology of the network 100 as well as desired time-sensitive network traffic flows. The configurator device 108 can be formed from hardware circuitry that is connected with and/or includes one or more processors that determine or otherwise obtain the topology information from the nodes 105 and/or user input. The hardware circuitry and/or processors of the configurator device 108 can be at least partially shared with the hardware circuitry and/or processors of the scheduler device 102. For example, the network control system 107 may represent a discrete device that includes all three of the network configurator device 108, the scheduler device 102, and the grandmaster clock device 110. The network control system device may be directly communicatively connected to at least one of the switches 104 (e.g., via a communication link 103), and may be at least indirectly communicatively connected to all of the switches 104 through the time-sensitive network 100.

The topology knowledge of the network 100 can include locations of nodes 105 (e.g., absolute and/or relative locations), which nodes 105 are directly coupled with other nodes 105, etc. The configurator device 108 can provide this information to the scheduler device 102, which uses the topology information to determine the schedule for communicating messages between the end devices 106. The configurator device 108 and/or scheduler device 102 can communicate the schedule to the different nodes 105. The configurator device 108 may configure the switches 104 of the nodes 105, such as by providing operating settings, set-up information, and/or the like to the switches 104. The configurator device 102 may also configure the end devices 106 of the network 100 that are time aware and support TSN mechanisms. The configurations of the switches 104 and the time-aware end devices 106 may be included in the topology knowledge of the network 100. A link layer discovery protocol can be used to discover the topology information.

The configurator device 108 receives the schedule generated by the scheduler device 102 and communicates the schedule to the time-aware systems (e.g., the switches 104 with respective clocks 112). The configurator device 108 may communicate with the time-aware systems through a network management protocol. In addition to the network management protocol, the configurator device 108 may also use at least one other method of communicating the schedule to the time aware systems, such as secure copy, file transfer, engineering tools, and/or offline/manual configuration. The time-aware systems implement a control plane element that forwards the commands from the scheduler device 102 to their respective hardware.

Figure 2:
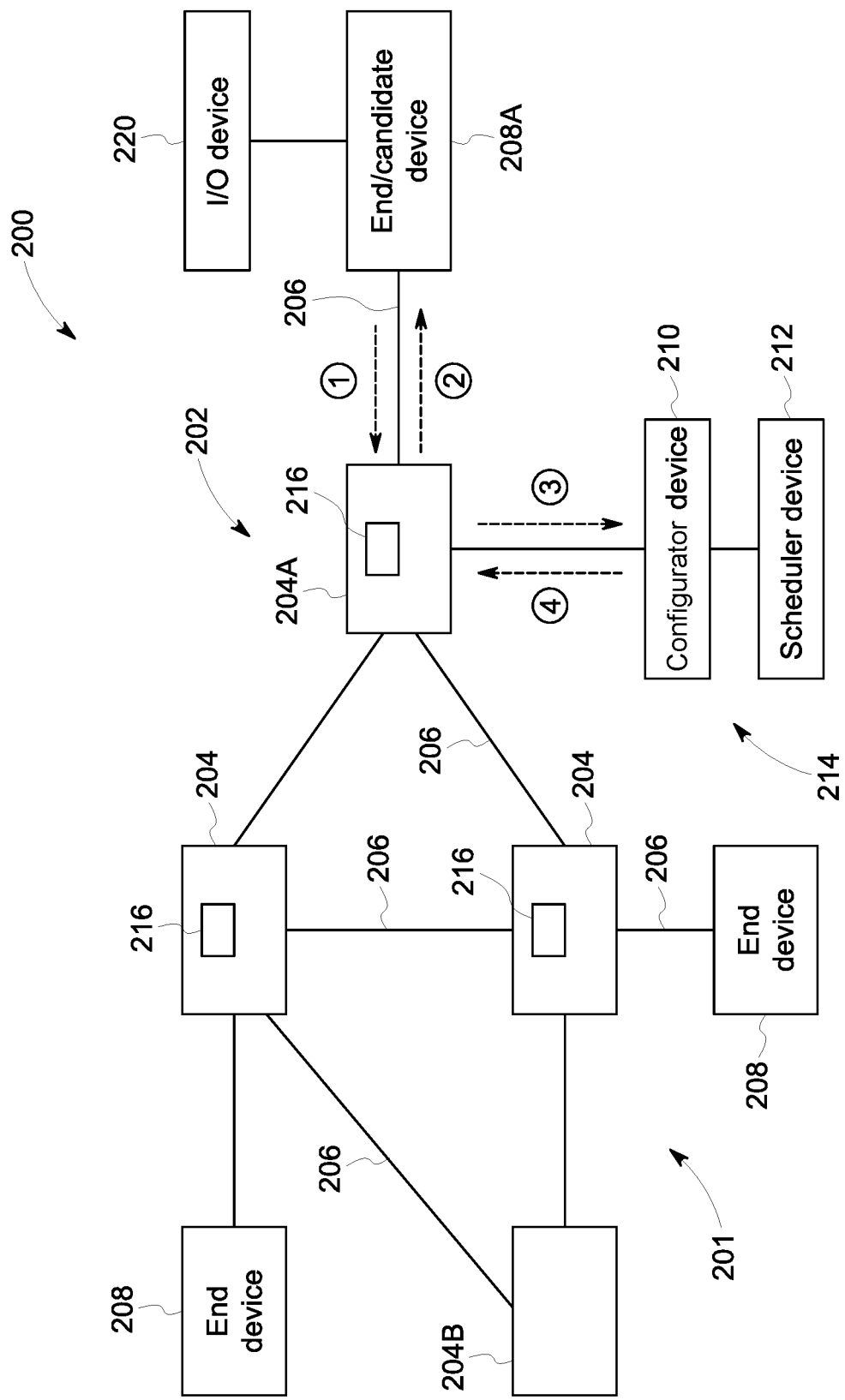
FIG. 2 illustrates a communication system that includes a time-sensitive network and a network access control system in accordance with embodiments herein.

FIG. 2 illustrates a communication system 200 that includes a time-sensitive network 201 and a network access control system 202 according to an embodiment. The network access control system 202 uses multi-factor authentication to restrict access to network communications through the time-sensitive network 201. The time-sensitive network 201 includes multiple communication devices 204 interconnected by communication links 206. The time-sensitive network 201 is used to communication information (e.g., messages) between end devices 208. The time-sensitive network 201 also includes a network configurator device 210 and a time-aware scheduler device 212 that together represent a network control system 214.

In an embodiment, the time-sensitive network 201 in FIG. 2 may represent the time-sensitive network 100 shown in FIG. 1. The network control system 214 may represent the network control system 107 shown in FIG. 1. The end devices 208 may represent the end devices 106 shown in FIG. 1. The end devices 208 may include or represent computers, sensors, servers, control devices, input/output devices, and/or the like. The communication devices 204 may represent the nodes 105 shown in FIG. 1. For example, the communication devices 204 may include or represent electrical switches (e.g., Ethernet switches), bridges, routers, hubs, and/or the like. The communication links 206 may represent the communication links 103 shown in FIG. 1. In an embodiment, the communication links 206 are cables that include one or more electrically conductive (e.g., metallic) wires and/or one or more optical fibers. For example, the cables may be serial cables (e.g., RS-232 cables), USB cables, Ethernet cables, or the like. In an alternative embodiment, the communication devices 204 may be communicatively connected to the end devices 208 through a wireless protocol, which may include a cellular connection, or a wireless connection through an intervening hardware device such as a router, server, or the like. The network control system 214 may configure the communication devices 204 and the end devices 208 of the network 201. The network control system 214 may communicate with the time-aware systems through one or more of a network management protocol, a secure copy, a file transfer, engineering tools, and/or an offline/manual configuration.

The network access control system 202 may share some components with the time-sensitive network 201. For example, the network access control system 202 may include one or more of the communication devices 204, the network configurator device 210, and/or the scheduler device 212 of the time-sensitive network 201. The network access control system 202 also includes at least one authorization system 216 used to authorize and authenticate devices that seek access to the traffic flows through the time-sensitive network 201.

In one or more embodiments, the communication system 200 may represent an industrial control system. For example, the communication system 200 may be used for providing communications between infrastructure in a power generation system (e.g., a power plant), a power delivery system (e.g., a power grid), an oil refinery, a manufacturing plant, or the like. The end devices 208 may represent components that are specific to the industrial application, such as sensors, actuators, valves, primary controllers (e.g., programmable logic controllers, remote terminal units, distributed control systems, or the like), workstations, servers, display devices, engineering stations, storage devices that include and maintain databases and records, and/or the like. The time-sensitive network 201 conveys control signals, data signals, status signals, confirmation signals, and the like between the end devices 208.

In an embodiment, the components shown in FIG. 2, including the end devices 208, the communication devices 204, and the network control system 214, may be disposed within an electronic security perimeter of the industrial facility. For example, the communication system 200 may be shielded against outside attacks via firewalls and other conventional cybersecurity systems, but there may be no electronic security barriers between the devices 204, 208 themselves to enable fast, uninterrupted communication between end devices 208 across the network 201. However, if an unauthorized user was able to gain access to an end device 208 via credential-harvesting, for example, that user may be able to disrupt the operations of the industrial control system, and may even be able to inflict damage.

In one or more embodiments, the network access control system 202 is configured to thwart credential-harvesting-based attacks by implementing multi-factor authentication prior to enabling access to the network communications through the time-sensitive network 201. For example, the network configurator device 210 may disable network access to all aperiodic traffic without prior multi-factor authentication by the user. The network configurator device 210 may disable the network access by controlling the communication devices 204 (e.g., switches) to block network access to any device that is not authorized. The multi-factor authentication is provided by the authorization system 216, which requires the user to provide at least two, if not more, forms or modalities of credentials to authenticate, such as a secret password, a one-time password sent to a device or system accessible to the authorized user, a fingerprint scan, or the like. Upon successful authentication, the network configurator device 210 may take one or more responsive actions to dynamically enable the user-operated end device 208 to have measured access to the time-sensitive network 201 for sending and/or receiving messages. For example, the network configurator device 210 may control the relevant communication device 204 (e.g., switch) to enable the user-operated end device 208 to communicate through the network 201. By requiring multi-factor authentication before accessing the time-sensitive network 201, the network access control system 202 is configured to provide security against even credential-harvesting-based attacks.

In FIG. 2, the communication devices 204 of the time-sensitive network 201 are switches 204 (and are referred to herein as switches). A first switch 204A is communicatively connected to a corresponding one of the end devices 208A via a communication link 206. The end device 208A may be a computer or workstation that is not authorized to access the network communications. For example, the first switch 204A blocks the end device 208A from transmitting data packets (or other information) onto the network 201 or receiving data packets from the network 201. The first switch 204A may include a port connected to a plug connector of the communication link 206 that extends from the switch 204A to the end device 208A. The switch 204A may represent an Ethernet switch, and the communication link 206 may be an Ethernet cable. The switch 204A may block the end device 208A by maintaining the port in a closed state to prevent forwarding data packets to the end device 208A and avoid accepting any data packets from the end device 208A.

In order to gain access, the end device 208A has to get authenticated. The end device 208A may apply for access to the network 201. For example, the end device 208A (also referred to herein as candidate device 208A) may send a network access request to the switch 204A (as shown by the dashed arrow "1" in FIG. 2). The network access request may be a message that identifies the source (e.g., the candidate device 208A) and requests initiation of an authentication protocol. The switch 204A receives the network access request and forwards the request to the authorization system 216. Although the port of the switch 204A may be closed, the switch 204A may be configured to still filter and analyze ingress data packets to detect the presence of the network access request. Optionally, the network access request may include addition information besides the source device, such as a requested end device 208 with which to communicate, an indication of a type of message or messages that the candidate device 208A would like to send and/or receive, and/or the like.

The authorization system 216 is communicatively connected to the switch 204A. The authorization system 216 may represent or include a server or program within a computing device that includes one or more processors. In the illustrated embodiment, the authorization system 216 is integrated with the switch 204A such that the authorization system 216 is physically mounted to, on, or within a housing or case of the switch 204A. The authorization system 216 may be manifested on a chip (e.g., a silicon chip device), within a storage medium as a software program, or the like. As shown in FIG. 2, several of the switches 204 include a respective integrated authorization system 216. Optionally, the switches 204 that include the authorization systems 216 are directly connected to end devices 208 that may require authentication. Switches 204 (like the switch 204B in FIG. 2) that are not directly connected to such end devices 208 may lack the authorization system 216.

In an alternative embodiment, at least one authorization system 216 may be discrete from the switches 204 and communicatively connected to the switches via wired and/or wireless communication pathways. In a first example, the authorization system 216 may be integrated within the network control system 214, such as hardware (e.g., a chip) or software within the network configurator device 210. Upon receiving a network access request, the switches 204 may forward the request to the network configurator device 210, which includes the authorization system 216, and await a response. In a second example, the authorization system 216 may be a discrete device that is communicatively connected to various switches 204. The authorization device may include respective hardware circuitry, such as one or more processors, and a data storage medium. For example, the discrete authorization device that includes the authorization system 216 may represent a server. The switches 204 may include integrated authenticator components. Upon receiving a network access request, the authenticator components of the switches 204 may forward the request to the authorization device and await a response.

The authorization system 216 is configured to implement a multi-factor authentication protocol that requires a user of the candidate device 208A to successfully provide multiple identification factors. The identification factors represent forms or modalities of evidence. Different factors include knowledge factors, possession factors, inherence factors, and multi-person factors. The knowledge factors refer to secret and/or personal information that an authorized user would know, such as a password, a PIN, the answer to a pre-selected question, and the like. The possession factors refer to physical objects that the authorized user would have, such as a mobile phone, an ID badge, a key, a one-time password provided on a different system, and the like. The inherence factors refer to physical characteristics of the authorized user, such as the user's fingerprint, eye iris, voice, and other biometrics. The multi-person factors require at least two people at different locations to do a designated task within a designated amount of time for authentication.

The multi-factor authentication protocol may require a user of the candidate device 208A to provide at least two different identification factors, such as a knowledge factor and a possession factor, a knowledge factor and an inherence factor, or a possession factor and an inherence factor before authorizing the candidate device 208A. Optionally, the protocol may require more than one identification within the same class factors, such as two passwords or two tokens. Optionally, the protocol may require successfully providing at least three identification factors before authorizing the candidate device 208A. The authorization system 216 may modify the number and/or complexity of the identification requirements based on the requested extend of access of the candidate device 208A to the network 201. For example, a request to only receive status signals from a sensor may be less risky than a request to send control signals to a turbine control system of a power plant, so fewer and/or less complex identification requirements may be issued in response to the former request relative to the identification requirements issued in response to the latter request.

The multi-factor authentication protocol may be applied by the switch 204A transmitting a prompt message to the candidate device 208A (as shown by dashed arrow "2"). The prompt message prompts the user operating the candidate device 208A to answer or submit the requested identification factors. In a non-limiting example, the prompt message may request the user to provide a secret password and also to scan an ID badge. The prompt message may be displayed on a display of an input-output device 220 that is part of, or connected to, the candidate device 208A. The input-output device 220 may include a keyboard, touchpad, touchscreen, voice amplifier, RFID reader, or the like, for receiving user-submitted responses to the identification factors in the prompt message. The submitted responses are relayed back to the authorization system 216 for analysis. The authorization system 216 may compare the received user-submitted responses to reference information stored within a look-up table in a database to determine if the responses match the reference information in the look-up table. The reference information is associated with a list of preauthorized users, such as employees with clearance permission to utilize the end devices 208 to communicate through the time-sensitive network 201.

The authorization system 216 is configured to authorize the candidate device 208A in response to verifying that the user-submitted responses to the identification factors match the reference information stored in the database. If, on the other hand, the authorization system 216 determines that the user-submitted responses differ from the stored reference information, then the candidate end device 208A is not authorized. For example, the switch 204A (or the authorization system 216) may send a notification message to the candidate device 208A and/or I/O device 220 informing the user that the network access request has been denied due to invalid or insufficient credentials.

In response to the authorization system 216 authorizing the candidate device 208A, the switch 204A is configured to grant the candidate device 208A restricted access to the time-sensitive network 201. For example, the switch 204A and/or authorization system 216 may communicate a notification message to the network control system 214 (dashed arrow "3" in FIG. 2) to inform the network control system 214 that the candidate device 208A is authorized. The notification message may include additional information regarding a "role" or level of access for which the candidate device 208A is authorized, such as the end devices with which the candidate device 208A is permitted to communicate, the types of messages that can be sent and received by the candidate device 208A via the network 201, and the like. The network configurator device 210 in response may reconfigure the switch 204A to enable the switch 204A to send messages to and/or receive messages from the candidate device 208A via the communication link 206 therebetween. The network configurator device 210 may communicate a control signal (dashed arrow "4" in FIG. 2) to the switch 204A via an interconnecting communication link 206 for reconfiguring the switch 204A. The switch 204A may be reconfigured to cause the switch 204A to periodically open the port in which the link 206 to the candidate device 208A is connected to exchange data packets with the candidate device 208A.

The network configurator device 210 optionally may take other actions to provide the restricted network access to the candidate device 208A including, for example, changing the internet protocol (IP) address of the candidate device 208A, changing a forwarding table of the time-sensitive network 201, or the like. Optionally, the scheduler device 212 may be configured to dynamically modify the schedule for the time-sensitive network 201 to accommodate communication of approved messages to and from the candidate device 208A via the switch 204A. For example, the modified schedule may instruct the switch 204A when to forward data packets to the candidate device 208A, when to accept data packets from the candidate device 208A, how to classify or prioritize the data packets accepted from the candidate device 208A, and/or the like.

In one or more embodiments, the candidate device 208A that is authorized is provided with limited or restricted access to the time-sensitive network 201 such that approved messages that the candidate device 208A can send and/or receive are limited in the type, number, timing, communication partner, and/or the like. In an embodiment, the approved messages that the candidate device 208A can send and/or receive may represent best-effort messages. The candidate device 208A may be prohibited from sending or receiving messages that are classified as high priority, time-critical messages, as these messages may be critical to safe operation of an industrial facility. Thus, the time-critical messages are not classified as approved messages in one or more embodiments. Allowing a user-controlled candidate device 208A, even a multi-factor-authenticated candidate device 208A, to send time-critical messages through the time-sensitive network 201 may compromise the integrity and security of the industrial facility. Therefore, the switch 204A and the other switches 204 may be configured to treat the messages received from the candidate device 208A as best-effort traffic. The switches 204 may communicate best-effort traffic through the network 201 at times outside of the designated time windows reserved for time-critical traffic. For example, upon receiving data packets from the candidate device 208A, the switch 204A avoids communicating any of these data packets during a scheduled time window reserved for time-critical traffic. The switch 204A may wait until an interval between two of the scheduled time windows before forwarding the data packets to another switch 204 or end device 208. The approved, best-effort messages may be unscheduled and communicated when there is available bandwidth and/or time between scheduled traffic. Optionally, the best-effort messages may be scheduled during designated time windows that do not overlap with the time windows reserved for the time-critical messages.

The restricted access may allow the candidate device 208A to exchange messages with at least some of the other end devices 208 in the network 201. For example, as a safety precaution, some of the end devices 208 may be designated as off-limit for the candidate device 208A to communicate with. The access may be restricted to a designated number of permissible communication partners out of the end devices 208. For example, the candidate device 208A may be configured to communicate with one end device 208 but not another end device 208. The access to the network 201 may also be restricted based on whether the candidate device 208A is the receiving party or the sending party in a message communication. For example, candidate device 208A may be permitted to receive messages from some end devices 208 without being permitted to send messages to those same devices 208, or vice-versa. In a non-limiting example, the authorized candidate device 208A is able to receive status signals from a machine controller but is not able to communicate control signals to the machine controller for designating changes to operational settings of the machine.

The access granted to the candidate device 208A may also be restricted by applying one or more limits to the amount of time or activity permitted before being blocked again from the network 201. For example, the restricted access may have a time limit. The switch 204A and/or network configurator device 210 may track the time elapsed since being authorized. Upon expiration of the time limit, the switch 204A may automatically block the candidate device 208A from the network 201 by not forwarding additional data packets to the candidate device 208A or accepting additional data packets from the candidate device 208A. The time limit may be based on application-specific considerations. For example, the time limit may be set to fifteen minutes, ten minutes, five minutes, or the like. After being blocked, the candidate device 208A will need to re-authenticate with the authorization system 216 to regain access to the network 201. There may also be an inactivity time-out function, such that detected inactivity at the candidate device 208A for at least a threshold amount of time (e.g., 5 minutes, 2 minutes, etc.) causes the switch 204A to automatically block the candidate device 208A from the network communications, even if the time limit has not been reached.

Similarly, the restricted access may designate a message count limit that refers to an aggregate number of network messages received by the candidate device 208A, network messages sent by the candidate device 208A, or both messages received and sent. Once the aggregate number reaches or exceeds the message count limit (e.g., 5 messages, 1 message, or the like), the switch 204A is configured to block the candidate device 208A as described above.

Optionally, the amount or extent of access granted to the candidate device 208A may depend on the level of clearance associated with the user identified during the authentication process. For example, the authorization system 216 can use the multi-factor authentication protocol to verify the identity of the user requesting access to the network 201. The authorization system 216 may include a database that lists information about various employees, such as clearance or access level. The network control system 214 (e.g., the network configurator device 210) may configure the switches 204 to provide a greater amount of access to a user with a higher clearance level than to a user with a lower clearance level. For example, the high clearance level user may be allowed to send and receive best-effort messages to all of the end devices 208, which the lower clearance level user may only be allowed to receive best-effort messages without being permitted to send best-effort messages, and/or may be restricted in the particular end devices 208 that the candidate device 208A can talk to.

The embodiments described herein can be implemented on existing network systems, such as Ethernet networks, while retaining most of the legacy components. For example, the switches may be the only devices that require an update. The update to the switches may include enabling the switches for time-sensitive networking and installing the authorization system 216. Therefore, the network access control system 202 described herein may enhance network security by thwarting credential-harvesting-based attempts to gain access to the network. The network access control system 202 may be relatively simple and cost effective to retrofit onto an existing network system.

Figure 3:
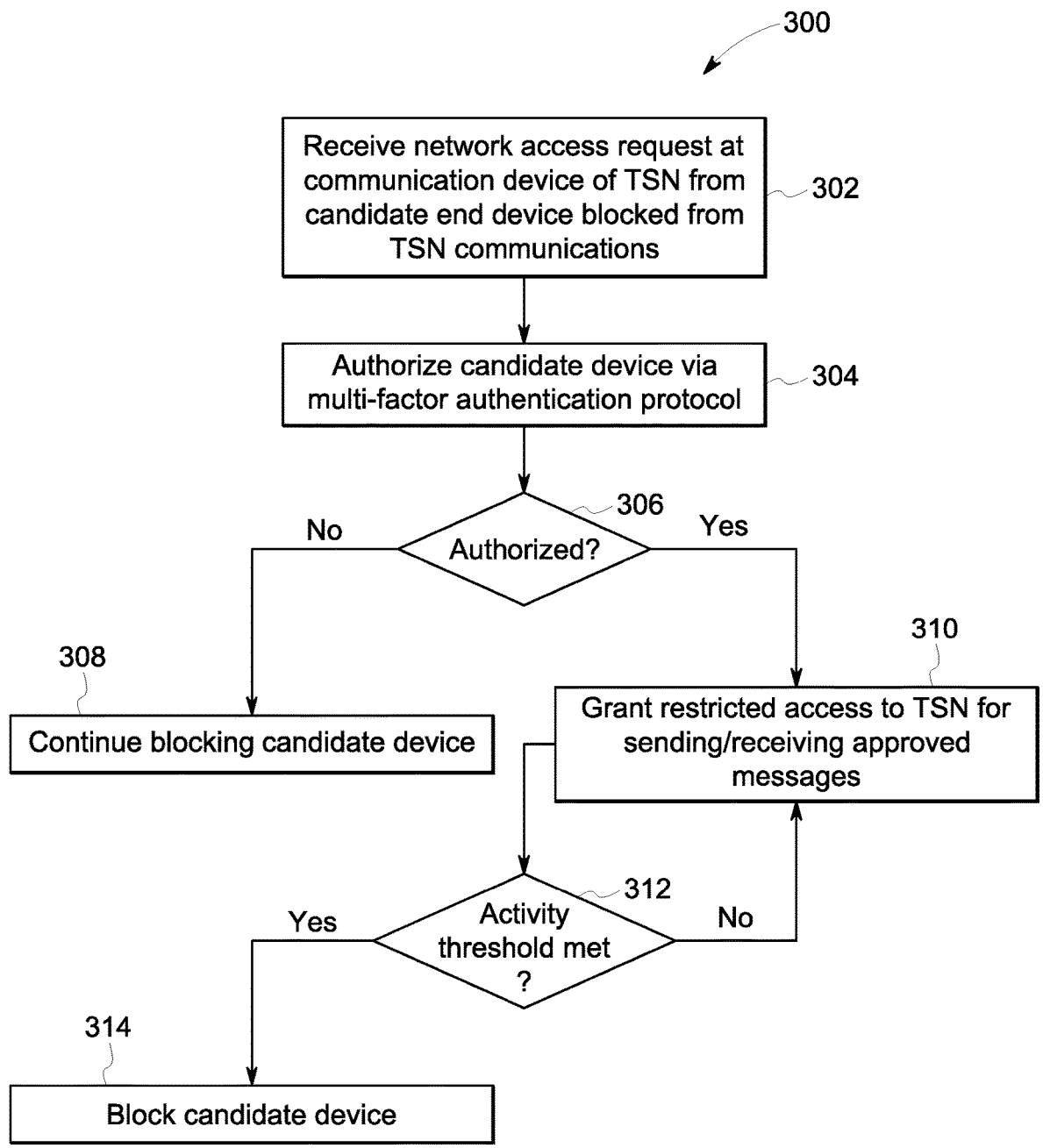
FIG. 3 is a flow chart of a method for restricting access to a time-sensitive network in accordance with embodiments herein.

FIG. 3 is a flow chart of a method 300 for restricting access to a time-sensitive network according to an embodiment. In one embodiment, the network access control system 202 of FIG. 2 may be used to perform the method 300. At 302, a network access request is received at a communication device that is configured to communicate time-critical messages through a time-sensitive network during scheduled time windows. The network access request is received from a candidate device while the candidate device is blocked by the communication device from communicating through the time-sensitive network.

At 304, in response to receiving the network access request, the candidate device is authorized via a multi-factor authentication protocol that requires a user of the candidate device to successfully provide multiple identification factors. The multi-factor authentication protocol may require the user of the candidate device to successfully provide at least two of a knowledge factor, a possession factor, or an inherence factor.

At 306, a determination is made as to whether the candidate device is authorized. For example, the candidate device may be authorized if user-provided responses to the multi-factor authentication protocol match with reference information stored in a look-up table within a database. If, on the other hand, the user-provided responses do not match the reference information, then the candidate device is not authorized. Candidate devices that are not authorized are blocked from accessing the network at 308. Blocked devices are not able to send messages using the network or to receive messages from the network. The blocked devices are not able to communicate with other end devices through the network.

At 310, in response to authorizing the candidate device, the candidate device is granted restricted access to sending and/or receiving approved messages through the time-sensitive network. The candidate device may be granted the restricted access by reconfiguring the communication device and/or modifying a schedule for message communication through the time-sensitive network to accommodate communication of the approved messages to and from the candidate device. The approved messages may be limited to best-effort messages that are unscheduled and lower priority than the time-critical messages. The communication devices may communicate the best-effort messages through the time-sensitive network outside of the scheduled time windows reserved for the time-critical messages. Furthermore, the communication device may be controlled to avoid communicating the approved messages during the scheduled time windows reserved for the time-critical messages to avoid interference.

At 312, it is determined whether a designated activity threshold is met. The activity threshold may refer to a time limit, a message count limit, a inactivity time period, and/or the like. If the designated activity threshold is met, upon expiration of a designated time limit and/or fulfillment of a designated message count limit, at 314 the candidate device is blocked from communicating through the time-sensitive network. If the designated activity threshold is not met, the candidate device continues to receive restrict access at 310.

At least one technical effect of the embodiments described herein is increased security for systems that utilize time-sensitive networks by requiring multi-factor authentication before granting access to the time-sensitive network, which thwarts credential-harvesting attacks. Another technical effect may include compartmentalizing the messages received from recently authenticated devices from time-critical messages transmitted through the network to avoid disturbing the time-critical messages. Yet another technical effect may include the ability to retrofit an established network infrastructure to include the network access control system and time-sensitive network with relatively minor updates to the nodes (e.g., switches).

In one or more embodiments, a network access control system includes a communication device and an authorization system. The communication device is configured to communicate time-critical messages through a time-sensitive network during scheduled time windows. The communication device is further configured to be communicatively connected to a candidate device and to receive a network access request from the candidate device while blocking the candidate device from communicating through the time-sensitive network. The authorization system is communicatively connected to the communication device and configured to authorize the candidate device via a multi-factor authentication protocol that requires a user of the candidate device to successfully provide multiple identification factors. In response to the authorization system authorizing the candidate device, the communication device is configured to grant the candidate device restricted access to one or more of send or receive approved messages through the time-sensitive network.

Optionally, upon granting the candidate device restricted access, the communication device is configured to avoid communicating the approved messages to or from the candidate device during the scheduled time windows reserved for the time-critical messages.

Optionally, the approved messages represent best-effort messages that are unscheduled and lower priority than the time-critical messages, and the communication device is configured to communicate the best-effort messages through the time-sensitive network outside of the scheduled time windows reserved for the time-critical messages.

Optionally, the time-sensitive network includes a plurality of end devices communicatively connected via multiple communication devices and communication links, and wherein the approved messages represent messages communicated with a designated subset of the end devices.

Optionally, the restricted access that is granted to the candidate device has a time limit, and the communication device is configured to block the candidate device from communicating through the time-sensitive network upon expiration of the time limit.

Optionally, the restricted access that is granted to the candidate device has a message count limit, and the communication device is configured to block the candidate device from communicating through the time-sensitive network upon an aggregate number of the approved messages one or more of sent to or received by the candidate device exceeding the message count limit.

Optionally, the multiple identification factors of the multi-factor authentication protocol include at least two of a knowledge factor, a possession factor, or an inherence factor.

Optionally, the network access control system further includes a network configurator device communicatively connected to the communication device, wherein in response to receiving an indication that the candidate device is authorized, the network configurator device is configured to reconfigure the communication device to provide the candidate device the restricted access.

Optionally, the network access control system further includes a time-aware scheduler device configured to generate a schedule for message communication through the time-sensitive network, wherein in response to receiving an indication that the candidate device is authorized, the time-aware scheduler device is configured to modify the schedule to accommodate communication of the approved messages to and from the candidate device through the communication device. Optionally, the authorization system is physically integrated with the time-aware scheduler device.

Optionally, the communication device is an Ethernet switch including multiple ports for connecting to multiple different communication links in the time-sensitive network, wherein the Ethernet switch is configured to open and close the multiple ports at respective designated times to communicate data packets, wherein the designated times are based on a schedule of the time-sensitive network.

Optionally, the authorization system is physically integrated within the communication device.

Optionally, the time-sensitive network is disposed within an electronic security perimeter of an industrial facility.

In one or more embodiments, a method for restricting access to network communications includes receiving a network access request at a communication device that is configured to communicate time-critical messages through a time-sensitive network during scheduled time windows. The network access request is received from a candidate device while the candidate device is blocked by the communication device from communicating through the time-sensitive network. Responsive to receiving the network access request, the method includes authorizing the candidate device via a multi-factor authentication protocol that requires a user of the candidate device to successfully provide multiple identification factors. Responsive to authorizing the candidate device, the method includes granting the candidate device restricted access to one or more of sending or receiving approved messages through the time-sensitive network.

Optionally, granting the restricted access includes controlling the communication device to avoid communicating the approved messages during the scheduled time windows reserved for the time-critical messages.

Optionally, the approved messages represent best-effort messages that are unscheduled and lower priority than the time-critical messages, and granting the restricted access includes communicating the best-effort messages through the time-sensitive network outside of the scheduled time windows.

Optionally, the restricted access that is granted to the candidate device has one or more of a time limit or a message count limit, and the method further comprises blocking the candidate device from communicating through the time-sensitive network upon one or more of expiration of the time limit or fulfillment of the message count limit.

Optionally, granting the restricted access includes one or more of reconfiguring the communication device or modifying a schedule for message communication through the time-sensitive network to accommodate communication of the approved messages to and from the candidate device through the communication device.

Optionally, authorizing the candidate device via the multi-factor authentication protocol includes requiring the user of the candidate device to successfully provide at least two of a knowledge factor, a possession factor, or an inherence factor.

In one or more embodiments, a communication system includes a time-sensitive network and an authorization system. The time-sensitive network includes plural communication devices interconnected by communication links. The communication devices are configured to communicate data packets representing time-critical traffic via the communication links during designated time windows according to a schedule of the time-sensitive network. The communication devices are also configured to communicate data packets representing best-effort traffic via the communication links outside of the designated time windows. The authorization system is communicatively connected to a candidate device via a first communication device of the communication devices. The first communication devices is configured to receive a network access request from the candidate device while blocking the candidate device from communicating through the time-sensitive network. The authorization system is configured to authorize the candidate device via a multi-factor authentication protocol that requires a user of the candidate device to successfully provide multiple identification factors. In response to the authorization system authorizing the candidate device, the first communication device is configured to grant the candidate device restricted access for one or more of sending or receiving messages within the best-effort traffic without permission to one or more of send or receive messages within the time-critical traffic.

Optionally, the first communication device is an Ethernet switch including multiple ports for connecting to multiple links of the communication links in the time-sensitive network. The authorization system is disposed within a housing of the Ethernet switch.

While the present disclosure has been described in terms of one or more particular embodiments, it is apparent that other forms could be adopted by one skilled in the art. It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A network access control system comprising:
a communication device configured to communicate time-critical messages through a time-sensitive network during scheduled time windows, the communication device further configured to be communicatively connected to a candidate device and to receive a network access request from the candidate device and forward the network access request to an authorization system while blocking the candidate device from communicating through the time-sensitive network; and
the authorization system communicatively connected to the communication device and configured to receive the network access request and to authorize the candidate device via a multi-factor authentication protocol that requires a user of the candidate device to successfully provide multiple identification factors, wherein the factors change based on an extent of access requested in the network access request,
wherein, in response to the authorization system authorizing the candidate device, the communication device is configured to grant the candidate device restricted access to one or more of send or receive approved messages through the time-sensitive network.

2. The network access control system of claim 1, wherein upon granting the candidate device the restricted access, the communication device is configured to avoid communicating the approved messages to or from the candidate device during the scheduled time windows reserved for the time-critical messages.

3. The network access control system of claim 1, wherein the approved messages represent best-effort messages that are unscheduled and lower priority than the time-critical messages, and the communication device is configured to communicate the best-effort messages outside of the scheduled time windows reserved for the time-critical messages.

4. The network access control system of claim 1, wherein the time-sensitive network includes a plurality of end devices communicatively connected via multiple communication devices and communication links, and wherein the approved messages represent messages communicated with a designated subset of the end devices.

5. The network access control system of claim 1, wherein the restricted access that is granted to the candidate device has a time limit, and the communication device is configured to block the candidate device from communicating through the time-sensitive network upon expiration of the time limit.

6. The network access control system of claim 1, wherein the restricted access that is granted to the candidate device has a message count limit, and the communication device is configured to block the candidate device from communicating through the time-sensitive network upon an aggregate number of the approved messages one or more of sent to or received by the candidate device exceeding the message count limit.

7. The network access control system of claim 1, wherein the multiple identification factors of the multi-factor authentication protocol include at least two of a knowledge factor, a possession factor, or an inherence factor.

8. The network access control system of claim 1, further comprising a network configurator device communicatively connected to the communication device, wherein in response to receiving an indication that the candidate device is authorized, the network configurator device is configured to reconfigure the communication device to provide the candidate device the restricted access.

9. The network access control system of claim 1, further comprising a time-aware scheduler device configured to generate a schedule for message communication through the time-sensitive network, wherein in response to receiving an indication that the candidate device is authorized, the time-aware scheduler device is configured to modify the schedule to accommodate communication of the approved messages to and from the candidate device through the communication device.

10. The network access control system of claim 9, wherein the authorization system is physically integrated with the time-aware scheduler device.

11. The network access control system of claim 1, wherein the communication device is an Ethernet switch including multiple ports for connecting to multiple different communication links in the time-sensitive network, wherein the Ethernet switch is configured to open and close the multiple ports at respective designated times to communicate data packets, wherein the designated times are based on a schedule of the time-sensitive network.

12. The network access control system of claim 1, wherein the authorization system is physically integrated with the communication device.

13. The network access control system of claim 1, wherein the time-sensitive network is disposed within an electronic security perimeter of an industrial facility.

14. The network access control system of claim 1, wherein the restricted access is based on a level of access of the candidate device to at least one of: communicate with a designated subset of the end devices and communicate via a pre-defined message type.

15. A method comprising:
receiving a network access request at a communication device that is configured to communicate time-critical messages through a time-sensitive network during scheduled time windows, the network access request received from a candidate device and forwarded to an authorization system while the candidate device is blocked by the communication device from communicating through the time-sensitive network;
responsive to receiving the network access request, authorizing the candidate device via a multi-factor authentication protocol that requires a user of the candidate device to successfully provide multiple identification factors, wherein the factors change based on an extent of access requested in the network access request; and
responsive to authorizing the candidate device, granting the candidate device restricted access for one or more of sending or receiving approved messages through the time-sensitive network.

16. The method of claim 15, wherein granting the restricted access includes controlling the communication device to avoid communicating the approved messages during the scheduled time windows reserved for the time-critical messages.

17. The method of claim 15, wherein the approved messages represent best- effort messages that are unscheduled and lower priority than the time-critical messages, and granting the restricted access includes communicating the best-effort messages through the time-sensitive network outside of the scheduled time windows reserved for the time-critical messages.

18. The method of claim 15, wherein the restricted access that is granted to the candidate device has one or more of a time limit or a message count limit, and the method further comprises blocking the candidate device from communicating through the time-sensitive network upon one or more of expiration of the time limit or fulfillment of the message count limit.

19. The method of claim 15, wherein granting the restricted access includes one or more of reconfiguring the communication device or modifying a schedule for message communication through the time-sensitive network to accommodate communication of the approved messages to and from the candidate device through the communication device.

20. A communication system comprising:
a time-sensitive network including plural communication devices interconnected by communication links, the communication devices configured to communicate data packets representing time-critical traffic via the communication links during designated time windows according to a schedule of the time-sensitive network, the communication devices further configured to communicate data packets representing best-effort traffic via the communication links outside of the designated time windows; and
an authorization system communicatively connected to a candidate device via a first communication device of the communication devices, wherein the first communication devices is configured to receive a network access request from the candidate device and forward the network access request to an authorization system while blocking the candidate device from communicating through the time-sensitive network,
wherein the authorization system is configured to receive the network access request and to authorize the candidate device via a multi-factor authentication protocol that requires a user of the candidate device to successfully provide multiple identification factors, wherein the factors change based on an extent of access requested in the network access request, and
wherein, in response to the authorization system authorizing the candidate device, the first communication device is configured to grant the candidate device restricted access for one or more of sending or receiving messages within the best-effort traffic without permission to one or more of send or receive messages within the time-critical traffic.

21. The communication system of claim 20, wherein the first communication device is an Ethernet switch including multiple ports for connecting to multiple links of the communication links in the time-sensitive network, and wherein the authorization system is disposed within a housing of the Ethernet switch.

* * * * *